(12) United States Patent
Neumair et al.

(10) Patent No.: US 12,404,943 B2
(45) Date of Patent: Sep. 2, 2025

(54) METHOD FOR SWITCHING AN ELECTROMAGNETICALLY ACTUATED HYDRAULIC VALVE AND HYDRAULIC VALVE

(71) Applicant: HAWE Hydraulik SE, Aschheim (DE)

(72) Inventors: Markus Neumair, Aschheim (DE); Benjamin Hasner, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 83 days.

(21) Appl. No.: 18/494,295

(22) Filed: Oct. 25, 2023

(65) Prior Publication Data

US 2024/0151317 A1 May 9, 2024

(30) Foreign Application Priority Data

Nov. 3, 2022 (DE) ..................... 10 2022 211 625.9

(51) Int. Cl.
*F16K 31/06* (2006.01)
*F16K 27/02* (2006.01)

(52) U.S. Cl.
CPC ........ *F16K 27/029* (2013.01); *F16K 31/0675* (2013.01)

(58) Field of Classification Search
USPC ............. 251/129.01, 129.04, 129.05, 129.15
See application file for complete search history.

(56) References Cited

U.S. PATENT DOCUMENTS

| | | | | |
|---|---|---|---|---|
| 6,332,454 B1 * | 12/2001 | Itabashi | ............... | F02M 59/366 123/499 |
| 6,513,371 B1 * | 2/2003 | Jett | ......................... | F02D 41/20 73/114.42 |
| 7,903,383 B2 * | 3/2011 | Fukano | ................. | H01F 7/1844 361/152 |
| 8,681,468 B2 * | 3/2014 | Jacob | .................... | H01F 7/1844 361/154 |
| 9,773,602 B2 * | 9/2017 | Vopel | .................. | F01L 13/0015 |
| 10,161,339 B2 * | 12/2018 | Kusakabe | ............. | F02D 41/401 |
| 10,253,900 B2 * | 4/2019 | Jefford | .................. | F16K 31/082 |
| 10,317,453 B2 * | 6/2019 | Narayanasamy | .... | G01D 5/2006 |
| 11,255,455 B2 * | 2/2022 | Goers | .................. | H01F 7/1615 |
| 11,391,389 B2 * | 7/2022 | Kamohara | ............ | F16K 31/082 |
| 11,569,017 B2 * | 1/2023 | Ferrarini | ............ | G01R 31/2829 |

(Continued)

*Primary Examiner* — Matthew W Jellett
(74) *Attorney, Agent, or Firm* — Dinsmore & Shohl LLP

(57) ABSTRACT

A method for switching an electromagnetically actuable hydraulic valve including a switching element and an electromagnet having a coil and an armature connected to the switching element for joint movement. When a current is applied to the coil, the armature moves together with the switching element from an initial position to an end position for a switching operation. The method includes the following steps: applying a switching voltage to the coil of the electromagnet to initiate the switching operation; capturing the current curve over time; reaching-detection of the end position of the switching element; determining a holding current taking into account the reaching-detection of the end position of the switching element and the captured current curve; and reducing the current applied to the coil to the determined holding current. A hydraulic valve with a control unit which performs the disclosed method is also disclosed.

10 Claims, 3 Drawing Sheets

(56) References Cited

U.S. PATENT DOCUMENTS

| | | | | |
|---|---|---|---|---|
| 11,612,160 | B2* | 3/2023 | Krosschell | A01M 7/0089 239/58 |
| 2011/0282597 | A1* | 11/2011 | Traversa | F01M 11/10 702/50 |
| 2020/0089261 | A1* | 3/2020 | Kono | G05B 19/042 |
| 2021/0219538 | A1* | 7/2021 | Krosschell | A01M 7/0089 |

* cited by examiner

METHOD FOR SWITCHING AN ELECTROMAGNETICALLY ACTUATED HYDRAULIC VALVE AND HYDRAULIC VALVE

CROSS REFERENCES TO RELATED APPLICATION

This application claims priority from German Patent Application No. 10 2022 211 625.9, filed on Nov. 13, 2022, the entire content of which is incorporated herein by reference in their entirety.

FIELD OF THE INVENTION

The present invention relates to a method for switching an electromagnetically actuable hydraulic valve and to a hydraulic valve. The hydraulic valve has a switching element, a control unit and an electromagnet.

BACKGROUND OF THE INVENTION

The electromagnets used in such hydraulic valves have a coil and an armature. The armature is connected to the switching element for joint movement, for example by a closed linkage, form fit or material closure. To perform a switching operation, a current is applied to the coil to move the armature together with the switching element from an initial position to an end position. The switching element can be, for example, a spool or a valve plug that rests against a valve seat. Depending on the use of the hydraulic valve, the switching operation blocks or releases a connection between an inlet and an outlet. Usually, these hydraulic valves are configured so that the switching element remains in or returns to the initial position when the electromagnet is de-energized, for example by a biasing force or a spring force acting on the switching element.

When the electromagnet is energized and the switching element moves to the end position as a result, it must be ensured that the switching element is held in the end position in order to maintain the desired switching position. For this purpose, a switching voltage is first applied to the electromagnet. The current thus increases up to a saturation current, with the hydraulic valve switching before the saturation current is reached. The saturation current applied to the electromagnet is then reduced to a holding current. Usually, the holding current is applied after a predefined period of time, which is sufficiently long to ensure that the switching element is in the end position. Usually, this holding current is a fixed proportion of the saturation current, for example 60% of the saturation current. In other cases, the holding current is not regulated, but the applied voltage is reduced to a fixed percentage on average, for example by means of pulse width modulation. As a result, the holding current also decreases, the magnitude of which depends on the ohmic resistance of the magnet, which in turn is influenced by the temperature, for example. Consequently, an increased temperature can lead to an unacceptably strong drop in the holding current.

The disadvantage of these solutions is that the holding current must be set to a level sufficiently high to compensate for external influences, such as temperature. In other words, with this solution, the so applied holding current is regularly significantly higher than the (minimum) holding current actually required. This can cause the electromagnet to heat up unnecessarily, which in turn has a negative impact on service life. It also increases energy consumption. Another disadvantage is that in many cases the actuating control unit has to be adapted to the valve. In other words, it is usually necessary to set manually how high the holding current should be. An alternative to this is, for example, also a automated setting via preset parameters. The disadvantage then lies in the creation of variants and the associated binding to the valve.

Alternatively, the holding current can also be set manually via a potentiometer. Manual adjustment is time-consuming and also not sufficiently accurate, so that this solution is also disadvantageous in terms of the service life of the electromagnet and energy efficiency.

SUMMARY OF THE INVENTION

Accordingly, it is the object of the present invention to provide a more efficient and uncomplicated method for switching an electromagnetically actuated hydraulic valve. It is further an object of the present invention to provide a corresponding hydraulic valve.

The solution of the problem is achieved with a method according to the embodiments disclosed herein. Preferable embodiments are described in the dependent claims.

According to the invention, the electromagnetically operable hydraulic valve comprises a switching element, a control unit and an electromagnet with a coil and an armature, the armature being connected to the switching element for joint movement. The coil is configured to move the armature together with the switching element from an initial position to an end position for a switching operation when a current is applied thereto or when a voltage is applied thereto respectively. The method according to the invention for switching such an electromagnetically actuable hydraulic valve is performed by the control unit and comprises the following steps: applying a switching voltage to the coil of the electromagnet to initiate the switching operation; capturing the current curve over time; reaching-detection of the end position of the switching element; determining a holding current taking into account the reaching-detection of the end position of the switching element and the captured current curve; and reducing the current applied to the coil or the voltage applied to the coil respectively to the determined holding current.

Hence, a switching voltage is therefore initially applied to the coil. The resulting saturation current is regularly higher than the current required to move the armature. After the switching voltage is applied, the current initially increases largely linearly until the armature moves and the switching process is initiated. Due to the change in inductance in the armature, the current curve changes as the armature moves. As soon as the armature has reached its end position, for example when the armature or the switching element abuts a stop, the current curve changes again and the current rises again largely linearly. The current curve is captured or monitored by the control unit beyond the point at which the end position is reached, and the reaching of the end position is detected. Based on the current curve and the detected reaching of the end position, a current low can be determined at the time at which the armature or the switching element initially reached the end position. The holding current for this switching operation is determined from this current low, for example by adding a safety factor to the current low. Of course, the current low can also be defined or used directly as the holding current. The current applied to the coil is then reduced to the determined holding current.

The method according to the invention makes it possible to determine the necessary holding current during each switching operation and without prior tuning of the control unit to the valve. This simplifies the starting up of the valve. In addition, the method according to the invention enables a significant reduction in energy consumption. Thus, excessive heating of the electromagnet can also be avoided. Since the holding current can be determined for each switching operation, external influences, for example temperature changes, can also be taken into account.

Preferably, the step of reaching-detection of the end position comprises the step of detecting a characteristic profile in the detected current curve, wherein the characteristic profile preferably is an inflection point in the detected current curve. As mentioned above, the current initially increases largely linearly when the switching voltage is applied. As soon as the armature moves and the switching process begins, the inductance in the armature initially increases as the speed of movement increases. Due to the conservation of energy, the current in the coil decreases as the inductance of the armature increases. As soon as the armature or the switching element are in the end position and further movement is no longer mechanically possible, the inductance in the armature is largely constant due to the then static position of the armature again. Consequently, the current in the coil increases again. At this point in time, an inflection point occurs in the current curve, which is characteristic and is therefore recognized. The current at the time of the inflection point corresponds to the current low when the end position is initially reached, from which the holding current can be determined.

In this context, it should be noted that the term "characteristic profile" is to be understood broadly in the sense of the invention. The characteristic profile may be the point at which the curvature behavior of the current curve changes, i.e., the inflection point. In some circumstances, however, there is no change in the curvature behavior of the current profile in some electromagnets or hydraulic valves, but only a sudden and striking rate of change in the slope of the current curve when the end position is reached. Such a prominent change in slope is also a characteristic profile in the sense of the invention. Furthermore, the inflection point need not be the first inflection point in the current curve. It is conceivable that due to the change in inductance in the armature during the movement and before reaching the end position, a first inflection point in the current profile is obtained, so that the inflection point when reaching the end position is the second inflection point in the current profile. In particular, the characteristic profile can also be derived from the largest possible difference between two inflection points in the current curve.

Alternatively, the hydraulic valve may comprise an end position detection device, with the end position of the switching element being detected on the basis of a signal from the end position detection device. The end position detection device can be a limit switch, for example. Thus, the current that was applied to the coil at the time indicated by the end position detection device as the time at which the end position was reached is read out from the captured current curve as the holding current of the switching process.

The holding current of the switching process can be used directly as the determined holding current. However, it is also conceivable that, when determining the holding current, a holding current glide value is formed from holding currents from at least two switching operations and used as the holding current, for example as a holding current average value. In particular, if the holding currents from a plurality of switching operations are averaged, a faulty switching of the valve, for example due to an outlier in the holding current of a switching operation, can be prevented. The average value can be a fixed average value over a certain number of switching operations, or a floating average value. It is also conceivable that the highest value of a predefined number of switching operations is used as the determined holding current to ensure reliable operation.

It is also conceivable that the holding current of a switching operation is buffered. Hence, an outlier analysis can be performed via the control unit, for example on the basis of the quartile distance or on the basis of common outlier tests. It is therefore also preferable if the hydraulic valve or the control unit comprises a memory.

Preferably, the reduction of the current applied to the coil to the determined holding current is effected from a predefinable point in time. This point in time can be defined manually, for example, or determined by the control unit on the basis of the current curve.

Preferably, the current corresponds to the saturation current before the reduction of the current applied to the coil to the determined holding current is effected. In this way, it can be ensured in any case that the switching operation is completed and the armature and the switching element respectively are in the end position.

Furthermore, the problem is solved with a hydraulic valve. The hydraulic valve is an electromagnetically actuable hydraulic valve comprising a switching element, an electromagnet and a control unit, the electromagnet comprising a coil and an armature connected to the switching element. The control unit is configured to perform the above described method according to the invention. In particular, the hydraulic valve is a binary-acting hydraulic valve. Such binary-acting hydraulic valves are also referred to as hydraulic black-and-white valves or hydraulic switching valves.

The switching element of the hydraulic valve may be, for example, a spool, a valve cone, or a closing element of a hydraulic valve formed in some manner. The hydraulic valve may further comprise a biasing element that biases the switching element to the initial position. This can ensure that the switching element is always in or returns to the initial position when the magnet is de-energized.

DETAILED DESCRIPTION OF THE DRAWINGS

Figure 1:
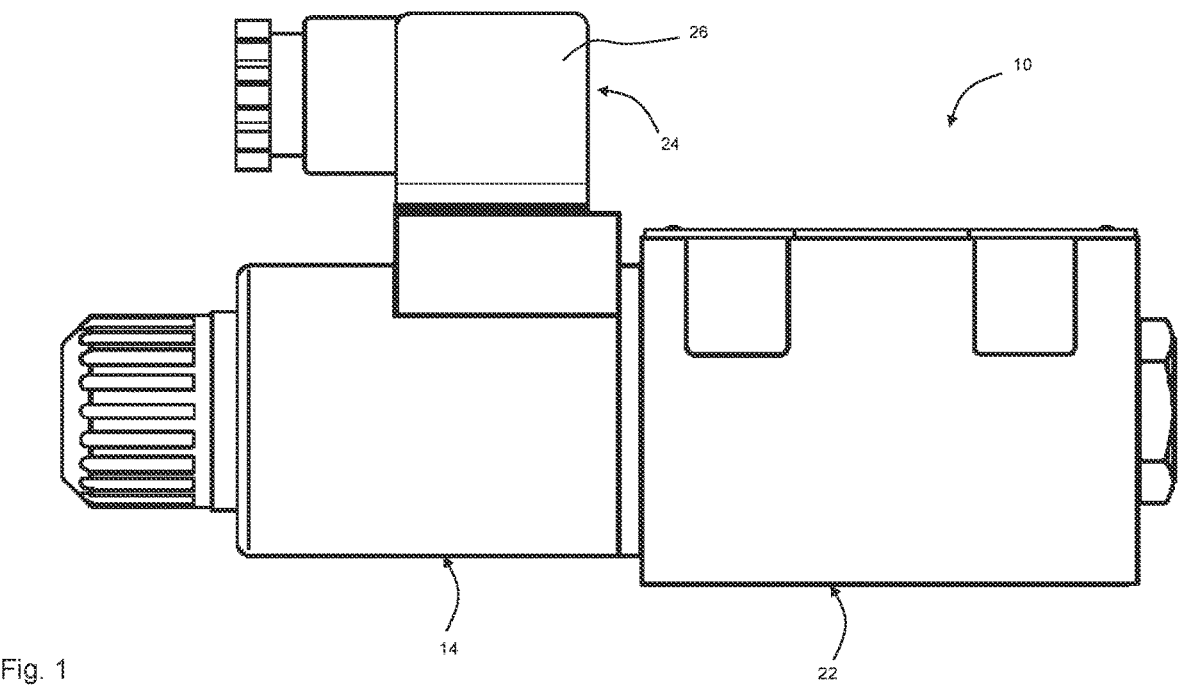
FIG. 1 is a side view of a hydraulic valve according to the invention.

FIG. 1 depicts a side view of a hydraulic valve 10 according to the invention. The hydraulic valve 10 is an electromagnetically actuable hydraulic valve 10 and comprises an electromagnet 14 secured to a valve housing 22 of the hydraulic valve 10. Further, the hydraulic valve 10 includes a connector 24 having a connector housing 26. As shown in FIG. 1, the connector 24 is disposed on the electromagnet 14. Via the connector 24, the electromagnet 14 can be supplied with power and possibly further signals. Furthermore, in this exemplary embodiment, a control unit 20 is disposed in the connector housing 26, cf. FIG. 2. The control unit 20 can, of course, also be disposed in the valve housing 22 or form an independent component.

Figure 2:
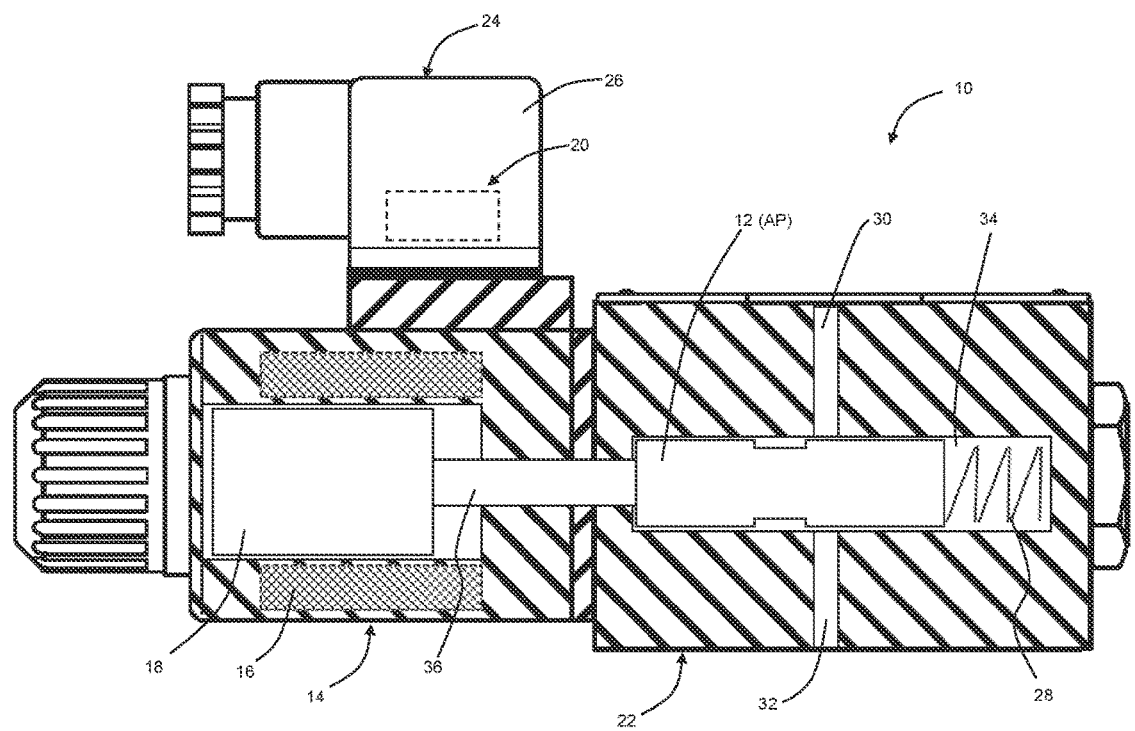
FIG. 2 is a partial section through the hydraulic valve shown in FIG. 1.

FIG. 2 shows a purely schematic, partial and simplified section through the hydraulic valve 10 shown in FIG. 1. An axial bore 34 is provided in the valve housing 22, in which a switching element 12 is axially movably disposed. In this exemplary embodiment, the switching element 12 is a spool piston. A first hydraulic port 30 and a second hydraulic port 32 each open into the axial bore 34 such that a fluid connection between the first hydraulic port 30 and the second hydraulic port 32 is either blocked or released depending on the position of the switching element 12 in the axial bore 34. Thus, in this embodiment, the hydraulic valve 10 is a binary-acting hydraulic valve. The first hydraulic port 30 may be, for example, a pressure port or tank port, and the second hydraulic port 32 may be, for example, a port for a hydraulic consumer.

In FIG. 2, the switching element 12 is shown in an initial position AP in which fluid communication between the first hydraulic port 30 and the second hydraulic port 32 is blocked. The switching element 12 is held in the initial position AP by a biasing element 28. For this purpose, the biasing element 28 in this exemplary embodiment is configured as a spring received in the axial bore 34. The biasing element 28 is supported on the valve housing 22 on the one hand and on the switching element 12 on the other hand and generates a force on the switching element 12 in the direction of the initial position AP.

In order to switch the hydraulic valve 10 and move the switching element 12 from the initial position AP to an end position EP, in which the fluid connection between the first hydraulic port 30 and the second hydraulic port 32 is opened, the electromagnet 14 is energized via the connector 24 and the control unit 20. For this purpose, the electromagnet 14 comprises a coil 16 and an armature 18. The armature 18 is disposed radially inwardly of the coil 16 and is connected to the switching element 12 via a connecting element 36, so that the armature 18 and the switching element 12 move together. The connecting element 36 may be a tappet, for example.

When the coil 16 of the electromagnet 14 is energized, the armature 18 is moved in a known manner. The movement of the armature 18 is transmitted to the switching element 12 via the connecting element 36, so that the switching element 12 is moved to the end position EP against the force applied by the biasing element 28. In this exemplary embodiment, the end position EP is mechanically predetermined, for example by a stop (not shown). In order to hold the switching element 12 in the end position EP, the coil 16 is energized with a holding current I1, which is determined via the control unit 20, as will be described in more detail below.

As soon as the coil 16 is no longer energized, only the force of the biasing element 28 acts on the switching element 12. The switching element 12 is moved by this force from the end position EP back to the initial position AP. At the same time, the armature 18 is moved synchronously with the switching element 12, since the movement of the switching element 12 is transmitted to the armature 18 via the connecting element 36.

Figure 3:
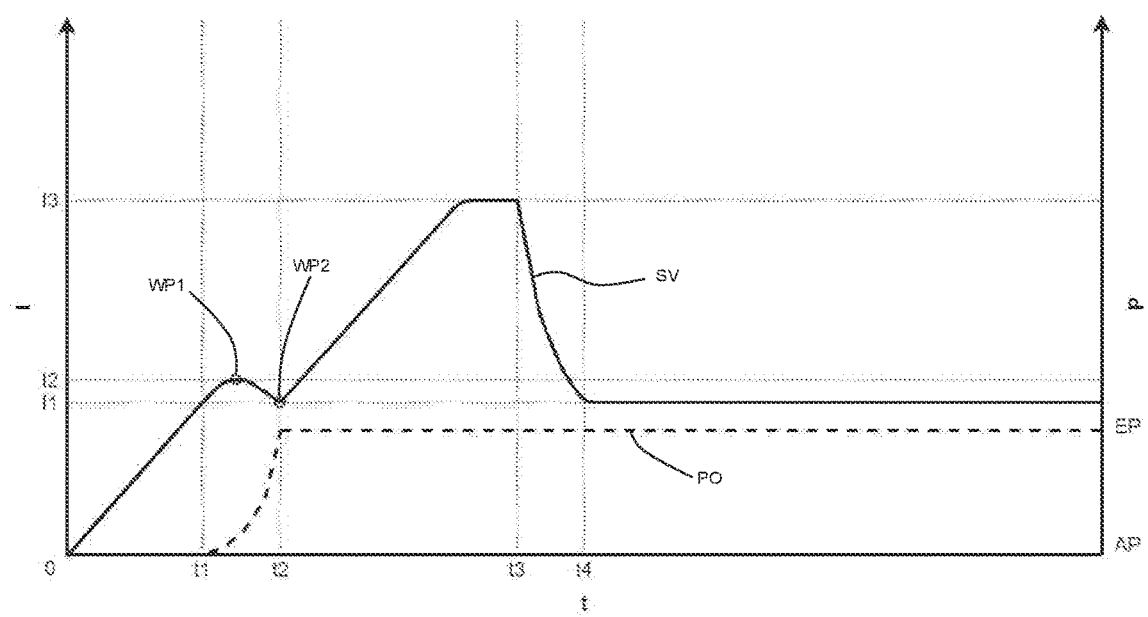
FIG. 3 is a diagram showing the current curve and the position of a switching element or an armature respectively of the hydraulic valve according to the invention.

In the following, a method for switching the hydraulic valve 10 according to the invention and performed out by the control unit 20 is now explained in more detail with reference to FIG. 3, where the abscissa represents the time curve t, the left ordinate the current I and the right ordinate the position P of the switching element 12 or of the armature 18.

To initiate the switching process, a switching voltage is applied to the coil 16 via the control unit 20. Initially, the current curve SV (solid line) then increases largely linearly up to a first point in time t1. At the first point in time t1, the movement of the armature 18 or the switching element 12 begins and the position PO (dashed line) of the switching element 12 or the armature 18 begins to change and the actual switching process begins. The inductance of the armature 18 increases slowly at first and then more and more as the speed of the armature 18 increases, and is at a maximum at the second point in time t2. Due to the applied switching voltage, the energy in the magnetic circuit increases continuously, which leads to an increase in current if the inductance of the electromagnet 14 remains constant. The movement of the armature 18 increases the inductance of the electromagnet 14. As the rate of change of the inductance increases, the slope of the electromagnet current decreases to a negative value due to the conservation of energy, although the energy present in the electromagnet circuit increases. Thus, the current curve SV first rises to a limiting current I2 and then drops from a first inflection point WP1 between the first point in time t1 and the second point in time t2.

At the second point in time t2, the end position EP of the switching element 12 or the armature 18 respectively is reached and the switching element 12 or the armature 18 respectively stop abruptly, due to a preferably mechanical limitation of the movement, whereby the current curve SV at the second point in time t2 corresponds to a current low, from which the holding current I1 results. In the embodiment shown, the current low corresponds to the holding current I1, but it is also conceivable that the holding current I1 results from the current low to which a safety factor is applied. The inductance is then largely constant again due to the static position of the armature 18 in the end position EP and the current curve SV increases again largely linearly from a second inflection point WP2 at the second point in time t2 until this corresponds to a saturation current I3. From a freely selectable or also predefined third point in time t3, the current curve is then reduced by the control unit 20 to the holding current I1, the holding current I1 being reached from a fourth point in time t4 and holding the switching element 12 in the end position EP, so that the fluid connection between the first hydraulic port 30 and the second hydraulic port 32 is and remains opened.

In order to determine the holding current I1, the current profile SV over time t is captured or monitored respectively by the control unit 20. The control unit 20 is configured to detect a characteristic profile in the captured current curve SV and to determine the holding current I1 therefrom. In this exemplary embodiment, the characteristic profile is the second turning point WP2 of the current curve SV. The control unit 20 thus determines the holding current I1 for this switching operation, which in this exemplary embodiment corresponds to the current low at the second turning point WP2 at the second point in time t2. Of course, the holding current I1 can also deviate from the current low, for example by taking a safety factor into account.

Depending on the configuration of the control unit 20, the holding current I1 of the respective switching operation can be used directly as the determined holding current, which is applied to the coil 16 from the point in time t3. It is of course also conceivable that the control unit 20 derives the determined holding current from the holding current I1 of several switching operations, for example as a moving average value. Furthermore, it is also conceivable that the control unit 20 directly qualifies any outliers as such and disregards them. It is also conceivable that the control unit 20 has a memory for this purpose in order to buffer or store the holding currents I1 of the individual switching operations.

In this embodiment, the freely selectable third point in time t3 for reducing the current to the determined holding current is selected so that the current applied to the coil 16 first rises to the saturation current I3. However, it is not absolutely necessary that the current first rises to the saturation current I3. Rather, the freely selectable third point in time t3 can also follow the second point in time t2 at a significantly shorter time interval, without the current applied to the coil 16 having already risen to the saturation current I3. In particular, the control unit 20 can be configured in such a way that the freely selectable third point in time t3 is optimized so that the hydraulic valve 10 is as energy-efficient as possible overall.

Furthermore, an end position switch (not shown) may be provided which signals the second point in time t2 to the control unit 20 i.e., the reaching of the end position EP by the switching element 12 or the armature 18 respectively. The control unit 20 thus detects the reaching of the end position EP by the corresponding signal of the end position switch and determines the holding current I1 of the switching process from the detected current curve SV as described above.

LIST OF REFERENCE SIGNS 10 hydraulic valve
12 switching element
14 electromagnet
16 coil
18 armature
20 control unit
22 valve housing
24 connector
26 connector housing
28 biasing element
30 first hydraulic port
32 Second hydraulic port
34 axial bore
36 connecting element
AP initial position
EP end position
I current
I1 holding current
I2 limiting current
I3 saturation current
P position
PO armature position
SV current curve
t1 first point in time
t2 second point in time
t3 third point in time
t4 fourth point in time
WP1 first inflection point
WP2 second inflection point

The invention claimed is:

1. A method for switching an electromagnetically actuated hydraulic valve, wherein the hydraulic valve comprises a switching element and an electromagnet having a coil and an armature, the armature being connected to the switching element for joint movement, and wherein the coil, when energized with a current, moves the armature together with the switching element from an initial position to an end position for a switching operation, the method being performed by a control unit and comprising the following steps:
applying a switching voltage to the coil of the electromagnet to initiate a switching process;
capturing a current curve over time;
reaching-detection of an end position of the switching element;
determining a holding current taking into account the reaching-detection of the end position of the switching element and the captured current curve; and
reducing the current applied to the coil to the determined holding current,
wherein the holding current of the switching operation is constant and uniformly derived from the current when the end position of the switching element is reached.

2. The method according to claim 1, wherein the reaching-detection of the end position comprises the following step:
detection of a characteristic profile in the captured current curve.

3. The method according to claim 2, wherein the characteristic profile is an inflection point in the captured current curve.

4. The method according to claim 1, wherein the hydraulic valve comprises an end position detection device, wherein the reaching-detection of the end position of the switching element is based on a signal from the end position detection device.

5. The method according to claim 1, wherein the holding current of the switching process corresponds to the current when the end position of the switching element is reached, or in that the holding current of the switching operation corresponds to a current when the end position of the switching element is reached to which a safety factor is applied.

6. The method according to claim 1, wherein the determination of the holding current comprises the following step:
generating a holding current glide value from the holding current of at least two switching operations.

7. The method according to claim 1, wherein the reducing of current applied to the coil to the determined holding current is effected from a predefinable point in time.

8. The method according to claim 1, where the current corresponds to a saturation current before the reduction of the current applied to coil to the determined holding current is effected.

9. An electromagnetically actuatable hydraulic valve comprising the switching element, the electromagnet and the control unit, wherein the electromagnet comprises the coil and the armature connected to the switching element, wherein the control unit is adapted to perform the method according to claim 1.

10. A hydraulic valve according to claim 9, wherein the hydraulic valve is a binary-acting hydraulic valve.

* * * * *